Oct. 13, 1964  S. KOFINK  3,152,554
THERMAL POWER MECHANISM
Filed March 24, 1961  5 Sheets-Sheet 1

INVENTOR
SIEGFRIED KOFINK

McGlew and Toren
ATTORNEYS

Oct. 13, 1964  S. KOFINK  3,152,554
THERMAL POWER MECHANISM

Filed March 24, 1961  5 Sheets-Sheet 2

INVENTOR
SIEGFRIED KOFINK
McGlew and Toren
ATTORNEYS

Oct. 13, 1964   S. KOFINK   3,152,554
THERMAL POWER MECHANISM

Filed March 24, 1961   5 Sheets-Sheet 3

INVENTOR
SIEGFRIED KOFINK
McGlew and Toren
ATTORNEYS

Oct. 13, 1964 S. KOFINK 3,152,554

THERMAL POWER MECHANISM

Filed March 24, 1961 5 Sheets-Sheet 4

INVENTOR
SIEGFRIED KOFINK
McGlew and Toren
ATTORNEYS

Oct. 13, 1964
S. KOFINK
3,152,554
THERMAL POWER MECHANISM
Filed March 24, 1961
5 Sheets-Sheet 5
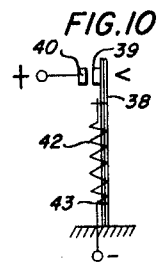
FIG.10
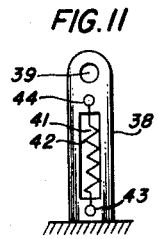
FIG.11
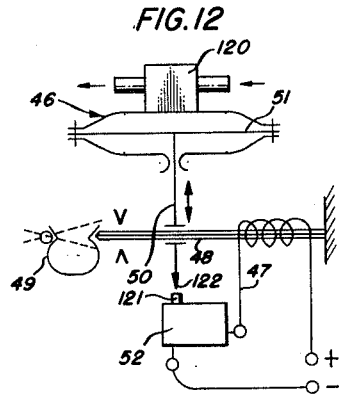
FIG.12
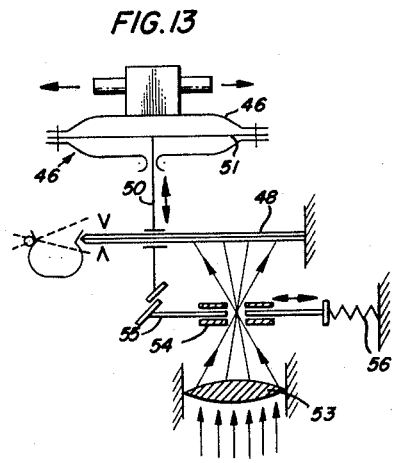
FIG.13
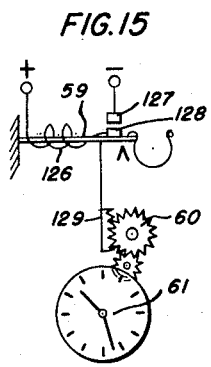
FIG.15
FIG.14
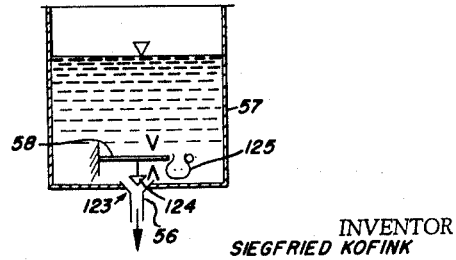
INVENTOR
SIEGFRIED KOFINK
BY McGlew and Toren
ATTORNEYS United States Patent Office 3,152,554
Patented Oct. 13, 1964

3,152,554
THERMAL POWER MECHANISM
Siegfried Kofink, Kirchstrasse 48, Zell (Neckar), Germany
Filed Mar. 24, 1961, Ser. No. 98,212
Claims priority, application Germany, Mar. 29, 1960,
K 40,281; June 23, 1960, K 41,006; July 9, 1960,
K 41,158
12 Claims. (Cl. 103—152)

This invention relates in general to thermal power devices and in particular to a new and useful mechanism actuated by heat and arranged to perform some useful work, such as the pumping of fuel, the operation of a control circuit, the driving of a fan and the like.

The basic idea of the present invention resides in the use of a bimetallic strip which is held so that it is bent toward one direction or the other. This metallic element, having any desired shape, such as, for example, strip-like, round, plate-like, etc., is associated with a tensional compression spring so that the spring opposes the movement of the bimetallic element caused by a thermal change during the first portion of the movement, for example, a third of said movement, but thereafter aids in the movement of the bimetallic element by urging it in the direction of movement. In the invention, means are provided to utilize the force produced by the continued change of position of a bimetallic element in response to temperature changes and aided by the spring for effecting work of a variety of natures.

For example, in accordance with a preferred embodiment of the invention, a bimetallic element is disposed in a heat path whereby heating of the element is effective to cause its deflection against a cool surface which in turn effects re-deflection back to its original position. In accordance with the invention, means are provided to initially oppose the movement of the bimetallic element in each direction of movement and to aid the spring and the movement after it has moved a predetermined amount to overcome the initial biasing. The continuous rapid movement back and forth thus produced is used by suitable mechanism to a device requiring a power drive, such as a pump, for example, for operation of the device by the bimetallic mechanism.

It is a feature of the invention that means are provided to aid the movement of the bimetallic element and to cause a motion which is rapid enough to permit it to be used for useful work purposes. Ordinarily bimetallic bodies operating alone would not move with any degree of speed or force to permit the movement action to be utilized other than for controlling purposes. The invention provides means for utilizing the expansive and contractive characteristics of the bimetallic element in conjunction with means such as a spring for first opposing the movement of the bimetallic element thereafter aiding the movement. In this way the element must stress, for example, until a force sufficient to overcome the opposing force is reached and when such expansion occurs then the motion of the combined mechanism is rapid in the direction of movement indicated.

Accordingly, it is an object of the invention to provide a thermal power device.

A further object of the invention is to provide a mechanism operated by heat including a bimetallic element and means for aiding the element and movement in response to temperature changes.

A further object of the invention is to provide a power mechanism comprising a bimetallic element and spring means biasing the element into extreme positions of travel, said spring means being arranged to aid the movement of said bimetallic element after it has responded to temperature changes to overcome the initial biasing force acting thereon.

A further object of the invention is to provide a thermal pump including a bimetallic element displaceable between prescribed limits from an expanded condition located in a low temperature zone to a contracted position located in a high temperature zone, and including means to bias element in each position but effective upon temperature change sufficient to overcome said biasing to aid in the movement of said bimetallic element to the opposite extreme position, the movement of the bimetallic element being employed to operate diaphragm means for effecting the pumping of liquid.

A further object of the invention is to provide a burner system including a fuel supply having a displaceable bimetallic element actuated by the heat of the burner and including auxiliary spring means arranged to aid the direction of movement of said bimetallic element caused by temperature changes and pump means in said fuel supply line operated by the movement of said bimetallic element.

A further object of the invention is to provide a power mechanism which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 3:
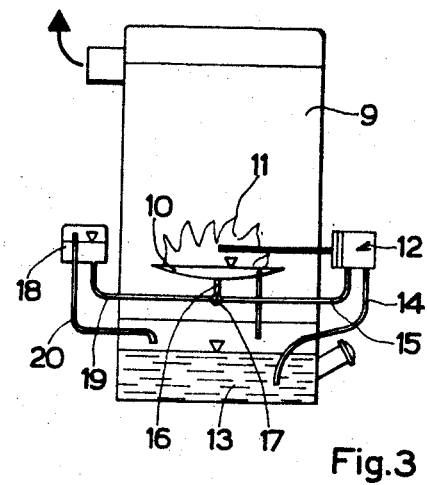
FIG. 3 is a somewhat schematic transverse section of a boiler having a thermal power mechanism arranged for driving a fuel supply pump in accordance with the invention.
Figure 3A:
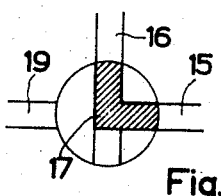
Figure 3B:
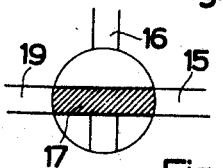
Figure 3C:
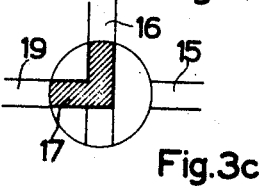
Figure 4:
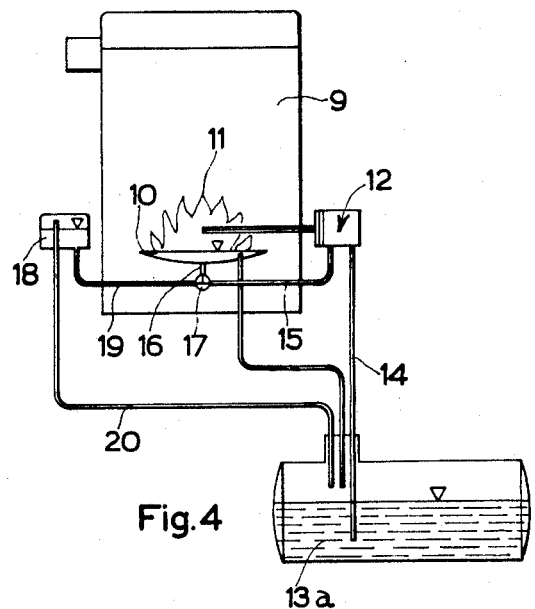
Figure 5:
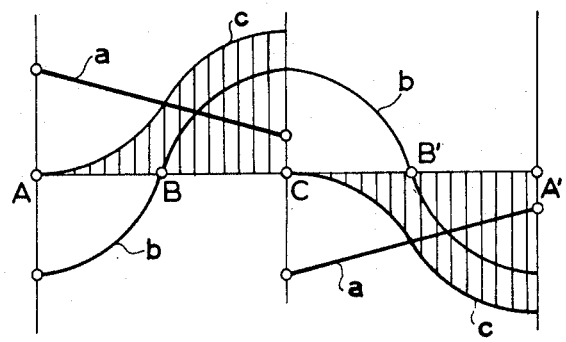
Figure 6:
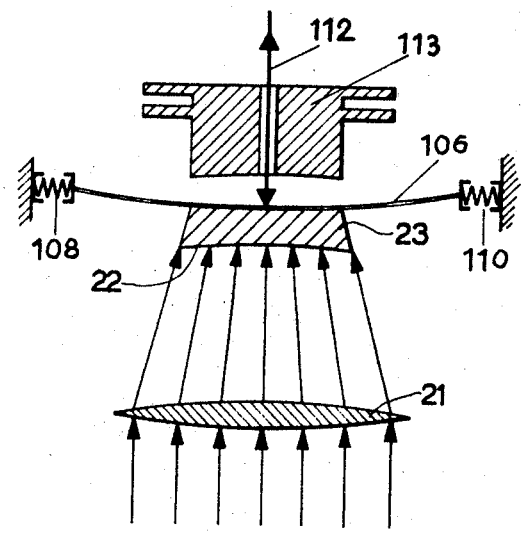
Figures 7, 8:
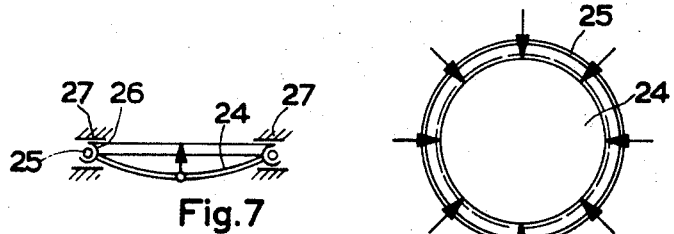
Figure 9:
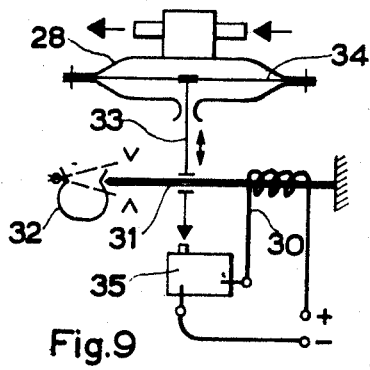

FIGS. 3a, 3b, and 3c are enlarged sectional views of the three-way valve employed in the boiler indicated in FIG. 3;

FIG. 4 is a view similar to FIG. 3 of another embodiment of the invention;

FIG. 5 is a graphical representation of the theoretical considerations of the invention;

FIG. 6 is a somewhat schematic transverse section of a thermal mechanism employing means for focusing heat energy on a bimetallic element in accordance with the invention;

FIG. 7 is a somewhat schematic indication of a disc-type thermal mechanism constructed in accordance with the invention;

FIG. 8 is a top plan view of the holding spring for the bimetallic element of FIG. 7 indicating the downwardly biasing action of the annular spring;

FIG. 9 is a schematic transverse section of a control circuit arrangement employing the thermal mechanism;

FIGS. 10 and 11 indicate side and front elevational views, respectively, of an electric thermal fuse constructed in accordance with the invention;

FIG. 12 is a schematic elevation of a pump driven by the thermal mechanism of the invention;

FIG. 13 is a view similar to FIG. 12 of another embodiment of the invention;

FIG. 14 indicates a valve construction employing the thermal power device constructed in accordance with the invention; and FIG. 15 indicates a timing switch mechanism having a thermal power device constructed in accordance with the invention.

Figure 1:
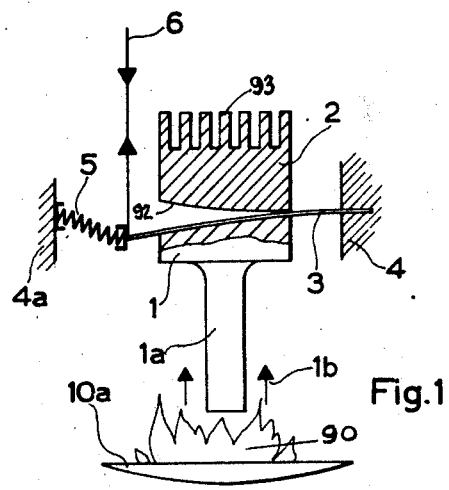
FIG. 1 is a schematic sectional view of a burner having a thermal mechanism arranged to operate a movable part of a pump associated with the burner in accordance with the invention.

Referring to the drawings in particular, the invention embodied in FIG. 1 includes a metallic member 1 which is disposed directly in the heat path of flames 90 of a burner disc 10a, the element 1 is provided with a curved upper surface 91 against which a bimetallic element 3 is held by means of a mounting member or casing disposed in a side of the furnace. Above the element 1 is disposed a cooling element 2 which is advantageously shielded from the high temperature in the furnace so that a lower curved surface 92 thereof is maintained relatively cool in respect to the curved surface 91. Heat from the element 1 causes the bimetallic element 3 to expand so that it is disposed against the curved surface 92. The cooling from the curved surface 92, which is enhanced by a fin structure 93, causes the bimetallic element 3 to return back to the position against the curved surface 91.

In accordance with the invention, a compression spring member 5 is held between a wall surface 4a and the free end of the bimetallic element 3. The center of position of the spring 5 is such that the bimetallic element 3 is biased against the surface 91 in the position indicated in the drawing and when it moves to the surface 92 it is also biased in that position by the spring 5. The spring 5, however, produces a biasing effect on the bimetallic element which may be overcome when the temperature change is sufficient to cause a sufficient expansive force of movement of the bimetallic element. When this occurs the end of the spring 5 which is holding the bimetallic element snaps beyond the center or pivot position of the opposite end so that its force then becomes an aiding force which causes rapid movement of the bimetallic element 3 against the surface 92.

It can be seen that the spring 5 causes rapid movement of the bimetallic element 3 in both directions against the curved surfaces 92 and 91, respectively. Since one of the surfaces is always maintained cool and the other is always within the path of the high temperature gases of the furnace and maintained hot, the motion of the bimetallic element 3 is continuous and rapid and the force is sufficient to be employed for a power driving operation. In the embodiment indicated in FIG. 1 the power drive is taken off the end of the bimetallic element 3 by a spindle or shaft portion 6 of a diaphragm pump generally designated 94 (see FIG. 2). The diaphragm of the pump is reciprocated by the movement of bimetallic element 3.

Figure 2:
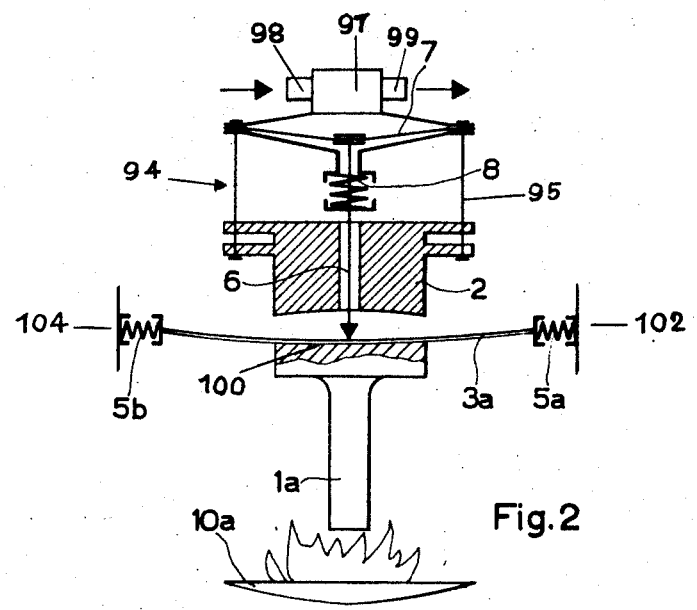
FIG. 2 is a view similar to FIG. 1 of another embodiment of the invention.

In the embodiment indicated in FIG. 2, the diaphragm pump 94 comprises an outer casing 95 mounted directly on the cold element 2 and having the shaft member 6 which is connected at its upper end to a diaphragm 7 which is flexed under the movement of the shaft 6 to pump liquid through a chamber 97 connected by means of suitable check valves to inlet conduit 98 and discharge conduit 99. The check valves in the conduits 98 and 99 permit only fluid flow in the directions indicated by the arrows during the flexing of the diaphragm 7.

A feature of the construction in FIG. 2 is that a hot element 1a is provided with a convex surface 100 against which the bimetallic spring 3a rests in its lowermost extreme position of movement. The shaft 6 is articulated to the central area of the bimetallic member 3a. In the embodiment, compressions springs 5a and 5b are mounted on wall structures 102 and 104, respectively, and biased against the ends of the bimetallic element 3a. When the bimetallic element 3a is heated sufficiently it will overcome the biasing forces of the springs 5a and 5b and begin to move upwardly, and when it flexes beyond a central position it will be aided by the forces of the spring in a direction toward the cool element 2. The same is true for reverse movement in an opposite sense.

In some instances, a spring 8 is connected to the shaft 6 to aid the diaphragm 7 in producing a downward movement of the bimetallic spring 3a indicated by the arrowhead at the lower end of the shaft 6.

In FIG. 3 there is indicated an oil furnace or burner 9 having a burner dish 10 in which oil is burned to produce flames 11 which heat a hot element portion of a pumping device 12 which is similar to the pump 94 indicated in FIG. 2. Continuous flexing of the bimetallic element 3a produces a fuel flow through a suction conduit 14 and discharge conduit 15 to the burner dish 10. A known regulating device (not shown) as, for example, a flue, is arranged to insure that only a sufficient quantity of fuel will be fed to the burner dish. This flow device may be arranged to actuate a three-way fuel valve 17 which may be positioned in the locations indicated in FIGS. 3a, 3b and 3c to permit flow to the burner dish 10, to conduit 19 and reserve container 18, or from dish 10 to conduit 19 and reserve container 18, as indicated in each of these views, respectively. An overflow conduit 20 is also provided to permit overflow of excess fuel from the tank 18 back to a reservoir supply 13 located at the bottom of the furnace 9.

In the embodiment indicated in FIG. 4, the furnace 9 is the same as in the previous embodiment with the except that tank 13a is provided at a remote location from the furnace. The connecting conduits are appropriately lengthened for this purpose.

In FIG. 5 there is indicated a graphic illustration of the operating principles of the invention. Line $a$ indicates the thermal force while curved line $b$ indicates the spring force associated therewith. Curve $c$ indicates the adjusting or working force which results therefrom. The abscissa indicates the working path while the ordinate indicates the positive or negative forces. The graph has not been drawn to scale because the operation does not depend on the actual magnitude of the forces but on the relative arrangement. At point A in the one end position of the working path the thermal force $a$ of the bimetallic element is assumed to be zero. The spring force $b$ at this point has still a certain value and holds the bimetallic element at the point A. When heat is applied to the bimetallic element when its thermal straightening force $a$ increases until it has reached the value of the opposing spring force $b$. When the thermal straightening force $a$ of the bimetallic element exceeds to some extent the spring force $b$ then the spring force will move from the end position A whereby a resulting force $b$ occurs and the bimetallic element flips over beyond B into the position C. B is a point at which the spring force flips over from the negative side toward the positive side and is equal to zero. Between B and C the spring force of the thermal straightening force is unidirectional. The same is repeated during cooling of bimetallic element. The bimetallic element will stay in the position C until the thermal straightening force $a$ again reaches the magnitude of the spring force $b$. Then there will be flipping back into the stop position A' which is identical with the point A.

In FIG. 6 there is indicated an example for utilizing the basic thermal force mechanism in a device such as a pump in which heat energy or a light source is employed for actuating the device. The heat energy is concentrated by a lens 21 and thrown on the surface 22 of a heat conducting part 23 where the heat is absorbed to flex a diaphragm 106 arranged between compression springs 108 and 110 similar to the other embodiments. An articulated member 112 is connected to means such as a pump 10 or other machine for the purposes of supplying driving power therefor and is reciprocated by the reciprocating movement of the diaphragm 106. A cold member 113 is provided as in the previous embodiment. The surface 22 may advantageously be coated black or constructed as a black body.

In FIGS. 7 and 8 a bimetallic element 24 is biased to a concave position as indicated by an annular spring 25 which is urged in a rotative direction as indicated by arrows in FIG. 8. The spring 25 rests in an annular guide 26 and 27 indicates the wall holding abutment. When the bimetallic element 24 is subjected to temperature changes to cause its expansion it will move after it overcomes the biasing force of the spring 25 to a position at which the force of the spring 25 thereafter aids the movement to cause a rapid flexing thereof. This arrangement of mechanism may be employed in apparatus as indicated in the other embodiments.

In FIG. 9 there is indicated an arrangement of an interrupter of a blinker of a thermal fuse or of a flipping switch. A bimetallic element 28 is secured at 29 and its free end is connected with a bent leaf spring 30. The leaf spring 30 is supported in bearings 31 and biases the end of a bimetallic element 28 which is held at one end in a support 29. Its free end is provided with a control contact 32 which coacts with a stationary contact 33 connected to a suitable current supply. At the other side of the bimetallic element there is provided an insulation extension 34 which causes contact of two switching contacts 35 and 36 upon heating of the bimetallic element 28 by means of a heating coil 37 to close the contact of the circuit. In this procedure the contacts 32 and 33 are open so that the circuit of the heating coil 37 is interrupted. The bimetallic element 28 is therefore cooled again to assume its starting position wherein the contacts 32 and 33 are closed while the contacts 35 and 36 are open.

In FIGS. 10 and 11 there is another embodiment of the thermal power mechanism as indicated for an electric thermal fuse or thermal flipping switch. A bimetallic element 38 is secured at one side and carries at its free end a switch contact 39. In a punched out central or window portion 41 of the element 38 a tension spring 42 is provided which is hooked at each end at 43 and 44. The switch contact 45 cooperates with a counter contact 40. The heat energy which is necessary for the operation of the device is supplied either by its electric resistance heat or by radiating heat. It is also possible to utilize the bimetallic element proper as an electric resistance conductor which is heated when the current flows through it. Morever, there is a possibility of arranging the device in a hot air current so that when a certain temperature has been reached the contacts 39 and 40 will be instantly opened or closed.

In FIG. 12 the thermal mechanism is employed for driving a pump generally designated 46. The operation of the pump 46 is similar to the operation of the pump 94 and includes a diaphragm 51 which is reciprocated by means of a shaft 50 to cause fluid movement through a chamber 120 as indicated by the arrow. Flexing of the shaft 50 is accomplished by means of a bimetallic element 48 which is actuated near a resistance heater 47. A flipping switch 52 is provided with a contact 121 which cooperates with a contact 122 in accordance with the position of the bimetallic element 48. The switch 52 controls a circuit for the heating coil 47 and downward movement of the bimetallic element 48 causes the closing of the circuit and the heating of the bimetallic element to cause it to move upwardly against and interrupt the circuit, and so forth.

In FIG. 13 a modification of the apparatus indicated in FIG. 12 is indicated. Instead of a heating coil 47 a collecting lens 53 is provided which concentrates the heat of the heating source and directs it through a diaphragm 54 onto the bimetallic element 48. The end of the piston rod 50 acts during the to and fro movement as indicated by the arrows on a slide or valve 55 which opens the diaphragm against the pressure of a spring 56 and thereafter closes again to intermittently cut off the heating focused on the bimetallic element 48. In this embodiment the thermal power effected operates the pump 46.

In FIG. 14 there is indicated a water tank or reservoir 57 having a valve generally designated 123 terminating in a discharge conduit 56 having an internal valve feed which is closed by a movable member 124. The movable member 124 is carried on a bimetallic element 58 which is biased by a U-shaped spring 125 in the manner of the previous embodiments. Changes of temperature of the liquid in the tank 57 causes actuation of the movable valve portion 124.

In FIG. 15 there is indicated a bimetallic element power mechanism which is arranged to drive a clock 61 through gearing 60. The mechanism includes the usual bimetallic element 59 which is heated by a coil 126 supplied from a power supply circuit having an open contact 127 which is closed when the bimetallic element 59 is flexed upwardly to bring a contact portion 128 at the end of coil 126 into contact with the coil 127. Movement of the bimetallic element in accordance with the heating of the coil 126 is sufficiently regular to produce a reciprocating motion transmitted to racks 129 to drive the gearing 60 and effect accurate time indications by the clock 61.

While specific embodiments of the invention have been shown and described in detail to illustrate the application of the invention principles, it will be understood that the invention may be embodied otherwise without departing from such principles.

What is claimed is:

1. A thermal power mechanism comprising spaced hot and cold elements, means for maintaining said hot and cold elements at different temperature levels, a bimetallic spring member disposed between said elements and movable into proximity, with a respective one of said elements at extreme positions of movement so as to be influenced by the temperature of said element, means to bias one end of said bimetallic element against movement away from its associated hot and cold elements, said means being effective after initiation of movement of said bimetallic element away from one of said elements toward the other of said elements to aid in such movement, and means connectable to said bimetallic element for transforming the motion thereof into useful work.

2. A thermal power device according to claim 1, wherein one end of said bimetallic element is anchored and said means for biasing said element includes a compression spring confined at its one end intermediate the path of movement of said bimetallic element and biased against an end of said bimetallic element.

3. A thermal power device according to claim 1, wherein said means to utilize the motion of said bimetallic element for useful work includes a rod connected to said bimetallic element and pump diaphragm means flexible by movement of said rod to cause pumping of a fluid including fluid inlet means connected to one side of said diaphragm permitting fluid inlet flow in one direction when said diaphragm is flexed in one direction and fluid outlet means connected to the same side of said diaphragm permitting fluid outlet flow when said diaphragm is flexed in an opposite direction.

4. A thermal power device according to claim 1, wherein said hot element includes a member disposed in a high temperature fluid stream.

5. A thermal power device according to claim 4, including a furnace in which said high temperature element is disposed in said furnace.

6. A thermal power device according to claim 5, including means for focusing heat energy against said bimetallic element.

7. A thermal power device according to claim 1, wherein said bimetallic element is a disc member and said biasing means includes an annular spring.

8. A thermal power device according to claim 1, including electric means to heat said bimetallic element and switch means connected to said electric means and interruptable by movement of said bimetallic element whereby to alternately disconnect said heating means.

9. A fluid pump comprising a pumping chamber, a flexible diaphragm disposed in said chamber, a bimetallic element connected to said flexible diaphragm, means to bias said bimetallic element in one end position, said means being effective upon movement of said bimetallic element to an opposite end position to aid in such movement, means to heat said bimetallic element and to thereafter cool said bimetallic element whereby expansion and contractive movement thereof causes flexing of said diaphragm and pumping of fluid including fluid inlet means connected to one side of said diaphragm permitting inlet flow in one direction when said diaphragm is flexed in one direction and fluid outlet means connected to the same side of said diaphragm permitting outlet flow when said diaphragm is flexed in an opposite direction.

10. A fluid pump according to claim 9, wherein said means to heat said bimetallic element includes a hot member disposed in a fluid heating path.

11. A fluid pump according to claim 9, wherein said means to cool said bimetallic element includes a cold member disposed adjacent said bimetallic element at one of its end positions.

12. A fluid pump according to claim 9, wherein said means to heat said bimetallic element includes means for focusing heat energy thereon, and means for cyclically interrupting said heat energy focusing means whereby to cool said bimetallic element.

References Cited in the file of this patent

UNITED STATES PATENTS

| | | |
|---|---|---|
| 1,946,590 | Rockwell | Feb. 13, 1934 |
| 2,262,205 | Schachtner | Nov. 11, 1941 |
| 2,468,996 | Olson | May 3, 1949 |
| 2,729,756 | Euler et al. | Jan. 3, 1956 |
| 2,798,440 | Hall | July 9, 1957 |
| 2,821,837 | McCorkle | Feb. 4, 1958 |
| 2,867,224 | Martiniak et al. | Jan. 6, 1959 |
| 2,882,678 | Crownover | Apr. 21, 1959 |